United States Patent [19]

Fletcher et al.

[11] Patent Number: 4,506,848

[45] Date of Patent: * Mar. 26, 1985

[54] AIRCRAFT CONFIGURATION AND CONTROL ARRANGEMENT THEREFOR

[75] Inventors: James Fletcher, Preston; Michael S. Wooding, Lytham St. Anne's, both of England

[73] Assignee: British Aerospace Public Limited Company, London, England

[ * ] Notice: The portion of the term of this patent subsequent to Oct. 23, 2001 has been disclaimed.

[21] Appl. No.: 329,131

[22] Filed: Dec. 9, 1981

[30] Foreign Application Priority Data

Dec. 22, 1980 [GB] United Kingdom ................ 8041043

[51] Int. Cl.³ .............................................. B64C 15/02
[52] U.S. Cl. .................................... 244/12.4; 244/130
[58] Field of Search ................... 244/12.1, 12.4, 12.5, 244/13, 15, 23 R, 23 A, 23 B, 23 D, 45 R, 45 A, 52, 54, 55, 56, 73 R, 119, 130

[56] References Cited

U.S. PATENT DOCUMENTS

| | | | |
|---|---|---|---|
| 2,870,978 | 1/1959 | Griffith et al. | 244/23 D |
| 2,912,188 | 11/1959 | Singelmann et al. | 244/12.5 |
| 3,209,535 | 10/1965 | Marchant et al. | 244/12.5 |
| 4,004,755 | 1/1977 | Hooper | 244/12.5 |
| 4,343,446 | 8/1982 | Langley | 244/73 R |

FOREIGN PATENT DOCUMENTS

| | | | |
|---|---|---|---|
| 1456080 | 4/1969 | Fed. Rep. of Germany | 244/52 |
| 2833678 | 2/1979 | Fed. Rep. of Germany | 244/12.5 |
| 1254696 | 1/1961 | France | 244/12.5 |

Primary Examiner—Trygve M. Blix
Assistant Examiner—Rodney Corl
Attorney, Agent, or Firm—Cushman, Darby & Cushman

[57] ABSTRACT

An aircraft includes a body 10, at least one nozzle 16 mounted for movement between an aft-directed position and a downwardly directed position, the arrangement being such that when the or each nozzle 16 is directed downwardly, the thrust generated thereby is directed along a line which lies substantially on the same lateral plane as an allowable first extremity of the center of gravity of the aircraft (e.g. aftmost). A trim jet 22 is positioned to exhaust beyond a second extremity of the center of gravity (e.g. foremost) and arranged to generate a trim thrust component to compensate for movement of the center of gravity of the aircraft between the first and second allowable extremities. Two nozzles 16 may be provided one to each side of the body 10 thus allowing a yaw component to be generated by differential movement of the nozzles.

10 Claims, 9 Drawing Figures

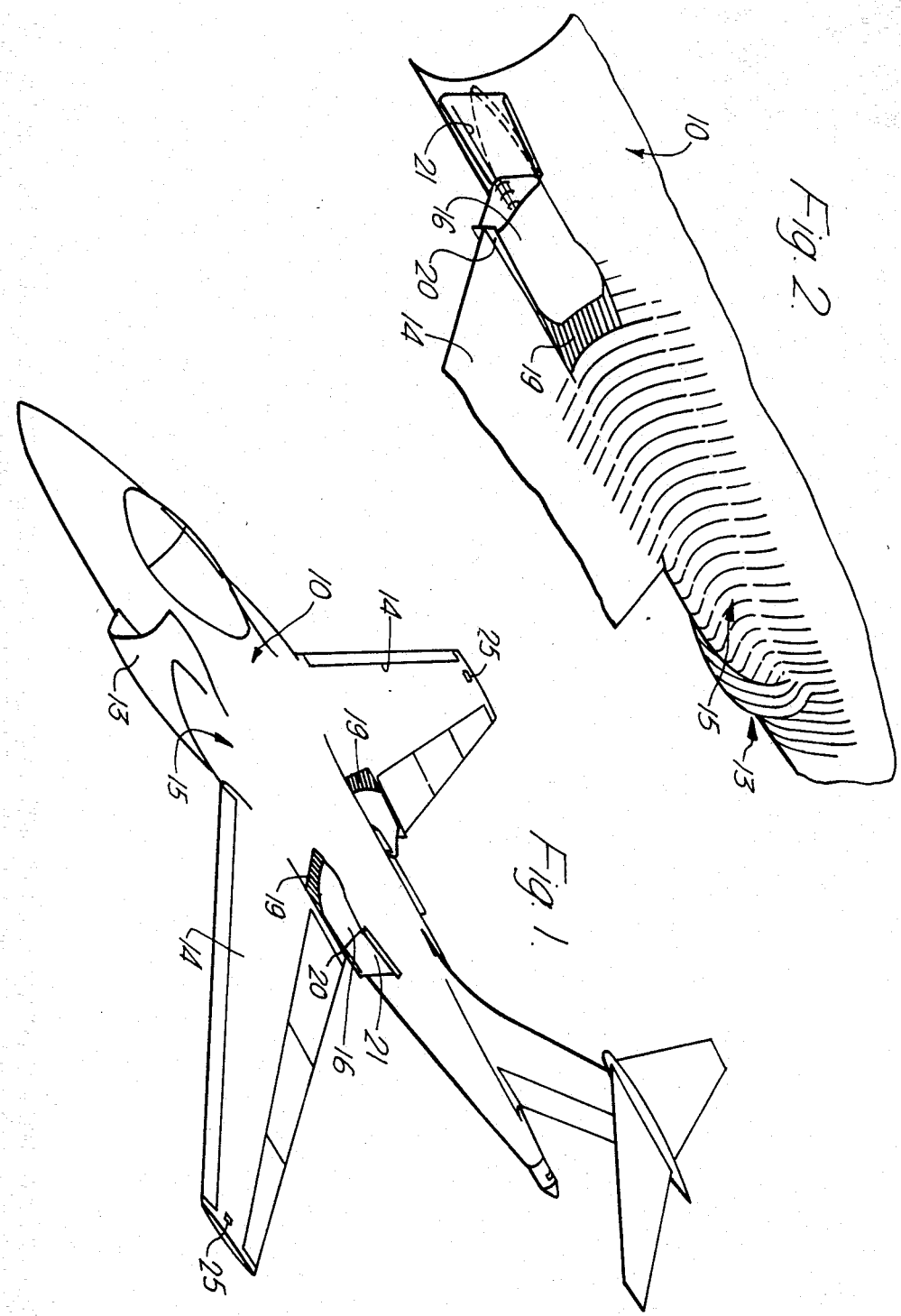

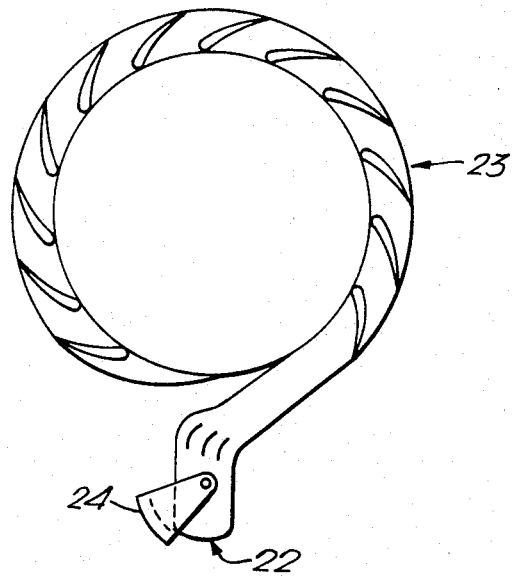
Fig. 5.
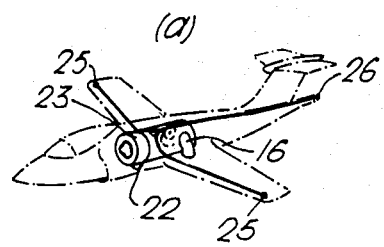
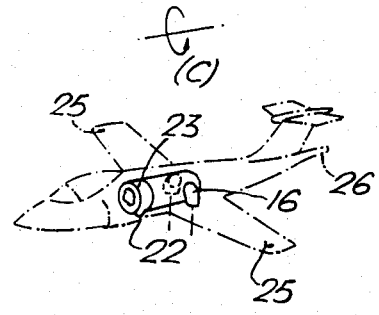
Fig. 6.
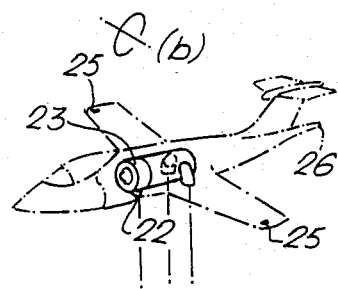
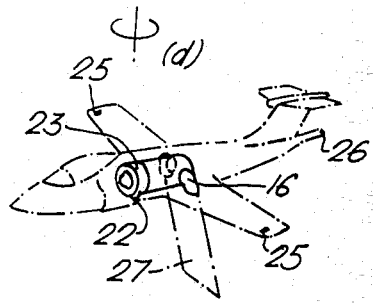

AIRCRAFT CONFIGURATION AND CONTROL ARRANGEMENT THEREFOR

This invention relates to an aircraft configuration and control arrangements therefor, the aircraft being of the jet propelled vertical and/or short take-off type having jet efflux outlets which are movable between an aft-directed position for propulsive thrust, a generally downwardly directed position for lift thrust.

Any references to direction such as up, down, forwards, rearwards, and so on, in this specification relate to an aircraft when in a straight and level flight attitude.

According to this invention, there is provided an aircraft of the jet propelled vertical and/or short take-off type, said aircraft including a body portion, powerplant means, at least one propulsion jet outlet means having an axis along which thrust generated thereby effectively acts and arranged to receive propulsion fluid generated by said powerplant means, the or each propulsion jet outlet means being movable between a position in which it or they are aft-directed and a position in which the or each axis is generally downwardly directed, and located such that the or each respective axis of thrust lies substantially within the same lateral plane as a first allowable extremity of the range of the centre of gravity position of the aircraft when directed downwardly, and trim jet means positioned to exhaust beyond a second allowable extremity of the range of the centre of gravity positions of the aircraft and arranged to generate a trim thrust component to compensate for movement of the centre of gravity of the aircraft between the first and the second allowable extremities.

It will be appreciated that the centre of gravity of an aircraft may move forwardly or rearwardly as fuel, stores etc. are consumed. If this is the case, there are allowable first and second extremities for the position of the centre of gravity beyond which the full control of the aircraft is not possible.

The aircraft preferably includes a pair of propulsion jet outlet means arranged one to each side of the body portion.

The propulsion jet outlet means may be movable in unison to effect lift or movable differentially to generate a yaw component.

Where a yaw component is generated by differential movement of the propulsion jet outlet means, an adverse roll component may also be generated in which case the aircraft preferably includes roll control jet means spaced from the aircraft longitudinal axis and being operable to generate a roll component to countermand any adverse roll component.

Conveniently, the or each propulsion jet outlet means is pivotally mounted such that the associated thrust axis intersects a common axis transverse to the body portion.

The aircraft may include pitch control jet means spaced from the range of the centre of gravity of the aircraft and being operable to effect control of the aircraft in the pitch sense.

In one embodiment, the or each respective axis of thrust of the propulsion jet outlet means lie substantially on the lateral plane containing the rearmost allowable centre of gravity when directed downwardly and the trim jet means comprise a trim jet positioned beyond the foremost allowable centre of gravity and arranged to exhaust generally downwardly.

Advantageously, the powerplant comprises a turbine engine with by-pass flow having a fan positioned at its front end and the trim jet means are fed by fluid bled from the fan, the flow of propulsion fluid through the trim jet means being incrementally variable.

Further aspects will become apparent from the following exemplary description, reference being made to the accompanying drawings, in which:

FIG. 1 is a general perspective view of an aircraft incorporating features of this invention;

FIG. 2 is a view, on an enlarged scale, of part of the aircraft of FIG. 1;

FIG. 5 is a view of part of a powerplant for use in the aircraft of FIG. 1, and

FIGS. 6a to 6d are schematic representations of various orientations of propulsion jet efflux and control jet outlets in the aircraft of FIG. 1.

Figure 3:
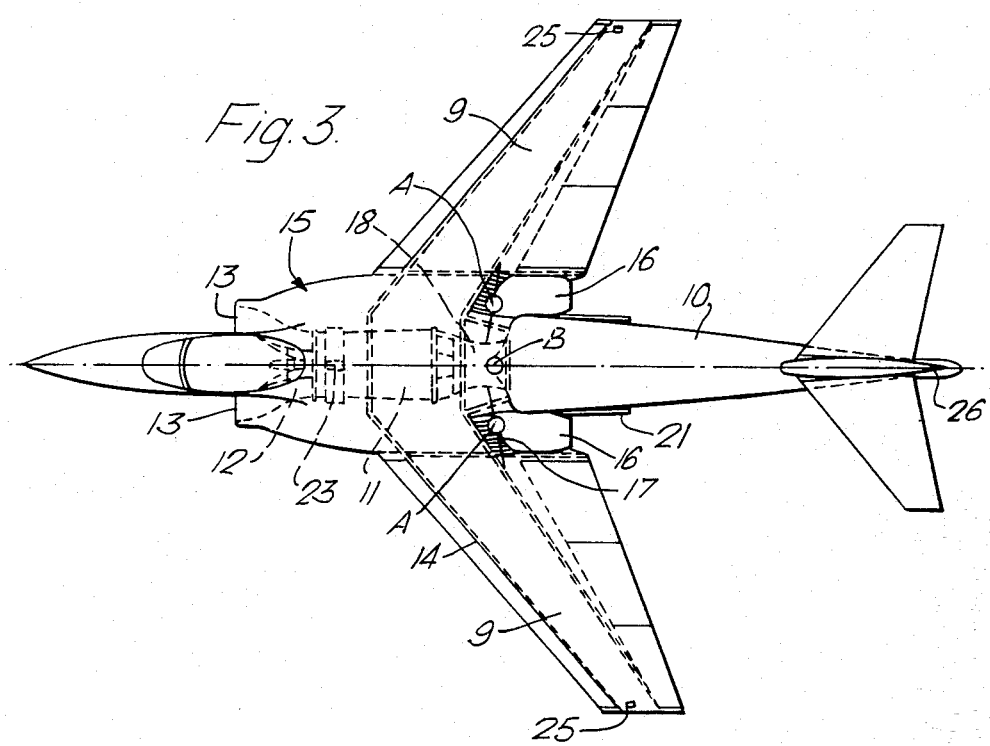
FIG. 3 is a detailed plan view of the aircraft of FIG. 1.

Referring initially to FIGS. 1 to 3, there is shown an embodiment of aircraft incorporating various features of this invention in which the propulsion jet outlet means are mounted for turning movement with respect to the aircraft body so that the propulsive thrust generated may be directed either rearwardly for propulsion purposes, or downwardly for lift purposes. The aircraft is therefore of the VSTOL type.

The aircraft comprises an aircraft body 10 including a powerplant 11 housed within the body. The powerplant receives air through a bifurcated duct 12 each limb of which is in flow connection with an intake 13, one positioned to either side of a forward portion of the aircraft body 10. A pair of wings 14 are attached one to each side of the aircraft body 10 and merge with the body at an intermediate portion 15.

Each intermediate portion 15 is defined by upper and lower surfaces which are shaped to induce lift as for a wing and which diverge rearwardly from the leading edge of the intermediate portion to a maximum thickness (typically at 40% Chord). The aircraft includes a skeletal structure 9 which is the main wing load-bearing structure of the aircraft and extends within each wing generally transversely of the body. The rearward region of each (nominal) intermediate portion 15 aft of the transverse structure 9 is cut away.

Both intermediate portions 15 extend well ahead of the wings 14 alongside the fuselage to form a strake or leading edge root extension.

A pair of propulsion jet outlet means, or nozzles 16, each comprising a duct and an outlet aperture, are mounted one to each side of the aircraft engine body 10, each in the cut-away region of the intermediate portion 15. The chordwise external cross-sectional shape of each duct is similar to that of the part of the intermediate portion 15 immediately forward of the nozzle, and the cross-section of the portion of the duct in the cut-away region is substantially that of the intermediate portion 15 at its maximum.

Upper and lower finger plates or hinged doors 19 extend between the rearmost portion of the intermediate portion 15 and the foremost portion of the nozzle so that the nozzle, finger plates, and intermediate portion together define a section having substantially continuous upper and lower surface profiles in the fore and aft thrust vectored condition. The duct therefore extends rearwardly within a projection of the transverse cross-section of the portion of maximum thickness of the intermediate portion, and the amount of drag attributable to each nozzle is low when the aircraft is in normal flight.

Each nozzle 16 is mounted for rotation with respect to the aircraft body 10 about an axis 17, by means of a bearing 18 within the aircraft body. The bearings 18 are provided one on each leg respectively of a bifurcated or "trouser" chamber mounted on the aft portion of the powerplant 11 which chamber receives the propulsion gases generated by the powerplant 11.

Turning drive means (not shown) are provided to effect movement of the nozzles 16, about their associated axes 17 either in unison, or differentially.

A scrub-plate 21 is provided on each side of the aircraft body immediately aft of the nozzle 16, to prevent a reduction in jet efficiency and to protect that part of the aircraft body.

An important feature of this embodiment is that the centre of thrusts A of each of the nozzles 16, when in the vertical hover position, lie in or adjacent a vertical transverse plane containing the aft-most allowable centre of gravity B of the aircraft. Thus, when the nozzles 16 are oriented so that they direct the propulsion jets vertically downwardly to provide jet lift, there is little or no pitch moment imparted to the aircraft.

Figure 4:
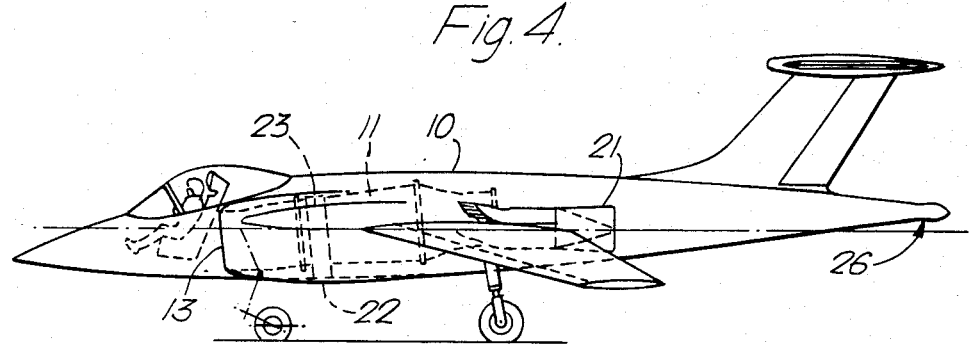
FIG. 4 is a detailed side view of the aircraft of FIG. 1.

The powerplant 11 preferably comprises a single turbine engine with by-pass flow having a fan positioned at its front end. Referring in particular to FIGS. 4 and 5, the aircraft includes a non-vectored trim jet 22 situated in the aircraft body 10 forward of the foremost allowable centre of gravity and adjacent the fan of the powerplant 11. The trim jet 22 is supplied by fluid bled from the fan by means of muff or volute 23 (FIG. 5). The muff or volute is positioned around the fan and adapted to receive a portion of the fan efflux via helical channels or ducts. The trim jet includes valve means 24 to control the amount of fluid leaving the jet 22. The trim jet 22 serves to compensate for any forward shift of the centre of gravity of the aircraft due for example to fuel usage, as explained later.

The aircraft is provided with roll control nozzles 25, provided one in each wing respectively and adapted to generate a roll control torque. Similarly, a pitch control nozzle 26 is provided at the tail of the aircraft to generate a pitch control moment, as explained later.

These nozzles are fed with pressure fluid bled off the powerplant 11 and are controlled in a conventional manner.

As an alternative to providing roll control nozzles, deflection means may be provided in the propulsion jet outlet means, the deflection means being operable to deflect the propulsion jet asymmetrically when the outlet means are directed generally downwardly thereby to generate a roll moment.

In the normal wing borne flight, the nozzles 16 are oriented so that they direct propulsion gases generally rearwardly—as shown in FIGS. 1 to 4. In normal wing borne flight, the trim jet 22 and roll and pitch control nozzles 25 and 26 respectively will be inoperative.

Referring to FIGS. 6a to 6d there are shown various configurations of propulsion jet efflux and control jet outlets for an aircraft. FIG. 6a is a general view of an aircraft showing the supply means for the control nozzles 25, 26.

When it is desired to use the aircraft in a 'hover' mode, the nozzles 16 are both moved to an orientation in which they direct propulsion gases vertically downwards. Since the centres of thrust of the nozzles 16 are located in the vertical plane containing the rearward centre of gravity of the aircraft, the aircraft will be maintained generally level for that configuration. Any forward shift of the centre of gravity of the aircraft caused, for example, by fuel usage or deployment of stores, will be sensed by the control system of the aircraft and a compensating thrust will be generated by trim jet 22, of a magnitude determined by the shift.

If, whilst the aircraft is in the hover mode, it is desired to effect or counteract a pitch movement of the aircraft, then a pitch control moment may be generated by directing pressure fluid either upwardly or downwardly from the pitch nozzle 26 (FIG. 6b).

Similarly, if it is desired to effect or counteract a roll movement of the aircraft, then a roll control moment may be generated by directing propulsive fluid upwardly from one wing tip and downwardly from the other wing tip through roll control nozzles 25, or vice versa (FIG. 6c).

If it is desired to effect or counteract a yaw movement of the aircraft, then the nozzles 16 are moved in opposite directions about a variable nozzle datum plane 27 (FIG. 6d). The differential movement of the nozzles 16 may induce a rolling movement which can be neutralised by means of thrust from the roll control nozzles 25.

The above embodiment of aircraft includes nozzles 16 of the form described and claimed in our co-pending U.K. Application No. 80-41042; the invention is not however limited to this form of movable nozzle and extends to aircraft incorporating other forms of movable nozzle.

We claim:

1. An aircraft of at least one of the jet-propelled vertical and short take-off type including a body portion, wings carried by said body by means of twin intermediate portions lying one on each side of the body and blending with both the body and the respective wing, a gas turbine powerplant means housed within said body portion, twin movable jet propulsion outlet means arranged one aft each intermediate portion respectively, arranged to exhaust substantially all the propulsion fluid generated by the powerplant, each intermediate portion having an upper and lower surface diverging to a region of maximum thickness and each jet propulsion outlet means when in aft directed position being shaped to lie substantially within a rearward projection of maximum thickness, each outlet means being movable between a position in which it is aft directed and a position in which it is downwardly directed and each being located such that when it is downwardly directed its axis of thrust lies substantially within the same lateral plane as a first allowable extremity of the center of gravity, and trim jet means positioned beyond a second allowable extremity of the center of gravity and arranged to compensate for movement of the center of gravity of the aircraft between said first and second extremities.

2. An aircraft as claimed in claim 1, wherein the propulsion jet outlet means are movable in unison to effect lift.

3. An aircraft as claimed in claim 2, wherein the propulsion jet outlet means are movable differentially thereby to generate a yaw component.

4. An aircraft as claimed in claim 3 which further includes roll control jet means spaced from the aircraft longitudinal axis and being operable to generate a roll component to countermand any adverse roll component generated when the twin propulsion jet outlet means are moved differentially.

5. An aircraft as claimed in claim 1, wherein each propulsion jet outlet means is pivotally mounted such that the associated thrust axis intersects a common axis transverse to the body portion.

6. An aircraft as claimed in claim 1, which further includes pitch control jet means spaced from the range of the centre of gravity of the aircraft and being operable to effect control of the aircraft in the pitch sense.

7. An aircraft as claimed in claim 1, wherein each respective axis of thrust of the propulsion jet outlet means lie substantially on the lateral plane containing the rearmost allowable centre of gravity when directed downwardly and the trim jet means comprise a trim jet positioned beyond the foremost allowable centre of gravity and arranged to exhaust generally downwardly.

8. An aircraft as claimed in claim 1, wherein the powerplant comprises a turbine engine with by-pass flow having a fan positioned at its front end and the trim jet means are fed by fluid bled from the fan.

9. An aircraft as claimed in claim 1, wherein the flow of propulsion fluid through the trim jet means is incrementally variable.

10. An aircraft according to claim 1, wherein the powerplant comprises a turbine engine with by-pass flow having a fan positioned at its front end and the trim jet means are positioned to exhaust fluid bled from the fan from a location of the body portion adjacent said fan.

* * * * *